United States Patent [19]

Åhlén

[11] 4,080,786
[45] Mar. 28, 1978

[54] HYDRODYNAMIC TORQUE CONVERTERS

[75] Inventor: Karl Gustav Åhlén, Bromma, Sweden

[73] Assignee: S.R.M. Hydromekanik, Stockholm-Vallingby, Sweden

[21] Appl. No.: 755,424

[22] Filed: Dec. 29, 1976

[30] Foreign Application Priority Data

Dec. 31, 1975 United Kingdom ............... 53376/75

[51] Int. Cl.² ............................................. F16D 33/00
[52] U.S. Cl. ............................................. 60/361; 60/367
[58] Field of Search ................. 60/341, 345, 361, 367

[56] References Cited

U.S. PATENT DOCUMENTS

| | | | |
|---|---|---|---|
| 2,306,758 | 12/1942 | Schneider et al. | 60/361 |
| 2,410,185 | 10/1946 | Schneider et al. | 60/361 |
| 3,071,928 | 1/1963 | Dundore et al. | 60/361 |
| 3,105,396 | 10/1963 | Dundore et al. | 60/345 X |

*Primary Examiner*—Edgar W. Geoghegan
*Attorney, Agent, or Firm*—Larson, Taylor and Hinds

[57] ABSTRACT

This invention relates to hydrodynamic torque converters and to torque converter blade systems. A torque converter in accordance with the invention is particularly suitable for transmissions for vehicles where a more or less distinct top speed is required even when direct drive is not used and where it is important to avoid the simultaneous existence of high torque absorption and low efficiency at high speed ratios. The blade system is characterized by a range of ratios for the radii of the outlet and inlet edges of pump, turbine and guide blades as well as a range of angles α, β, γ and δ as herein defined and set out in a tabular form in the Specification.

14 Claims, 19 Drawing Figures

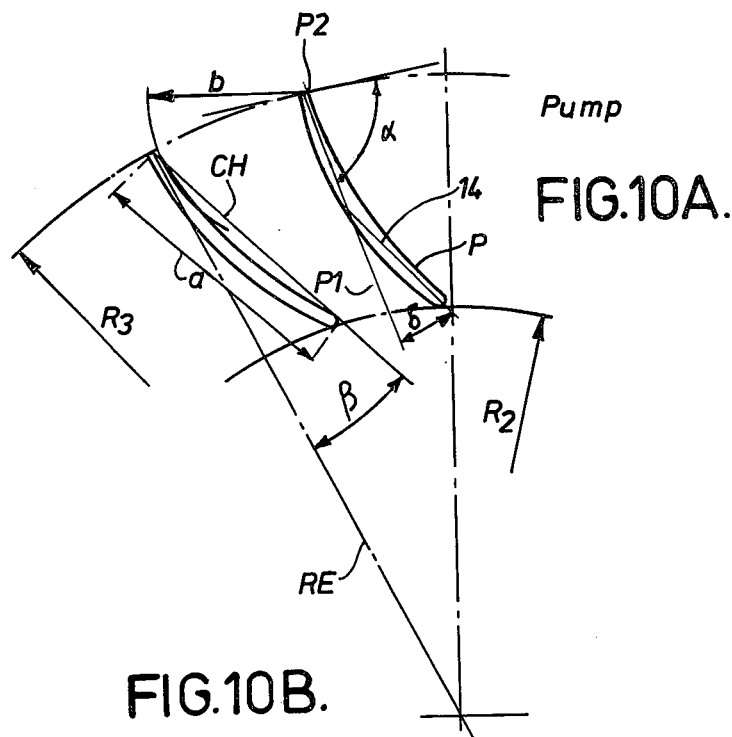
FIG.10A.
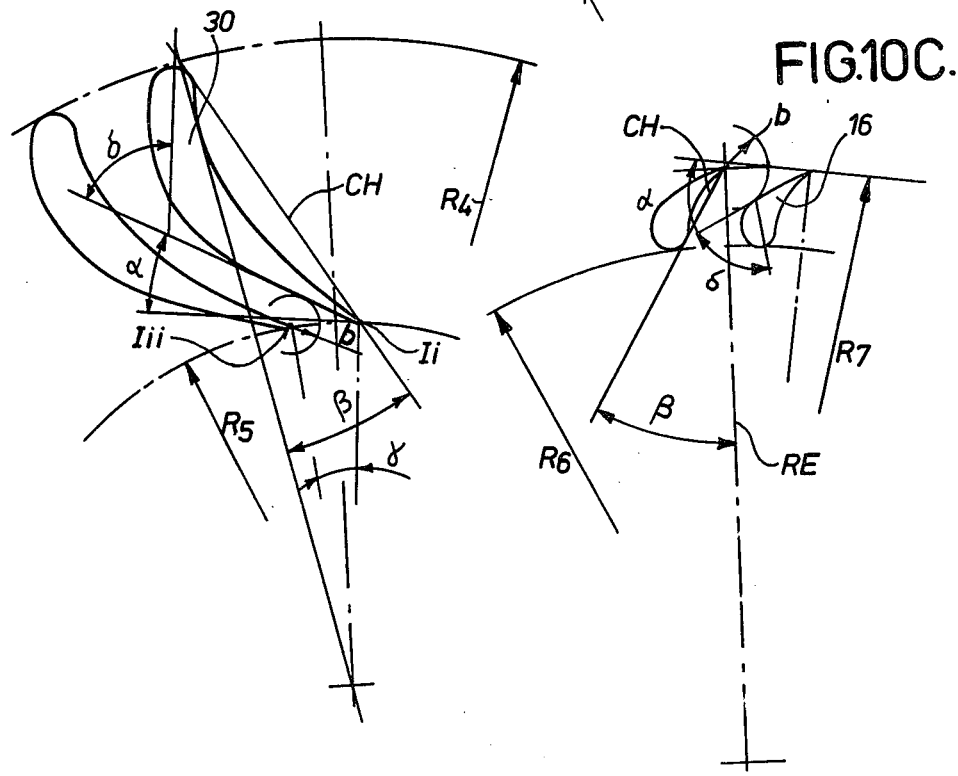
FIG.10B.
FIG.10C.

HYDRODYNAMIC TORQUE CONVERTERS

This invention relates to hydrodynamic torque converters and especially to a torque converter blade system which affords improved input torque and efficiency characteristics when compared with known torque converter blade systems. The torque converter of the invention is particularly suitable for use in transmissions for vehicles, where a more or less distinct top speed is required even when direct drive is not used and where it is important to avoid the simultaneous existence of high torque absorption and low efficiency at high speed ratios. The invention is also applicable to very large torque converters in which a one-way clutch cannot be used for releasing a ring of guide blades but, nevertheless, necessitating the use of a lock-up clutch. Where the use of a one-way clutch on the guide ring is advisable, the characteristic features of a torque converter according to the invention are such that the free wheel operates under especially favourable conditions.

It is characteristic of hydrodynamic torque converters that the extent to which the input torque is increased or multiplied by the converter is greatest at/or close to stall condition, that is, with the pump member operating and with the turbine member standing still. As the speed ($n_2$) of the turbine member rises from zero relative to the speed ($n_1$) of the pump the torque multiplication usually referred to as the torque ratio, decreases, and at some value of the ratio $n_2/n_1$ less than unity, the value of the output torque falls to that of the input torque. When this point, commonly referred to as the shift point, is reached the apparatus no longer functions as a torque multiplying device and, if the speed of the turbine member is increased to produce a higher value of $n_2/n_1$ than that at the shift point, the output torque falls to a value less than that of the input torque, so that the apparatus has no utility. Thus the useful range of a hydrodynamic torque converter is normally between stall and shift point.

Generally speaking torque converters fall into one of two main types, namely a 1½-stage type or a 2-stage type. In the 1½-stage type the torque converter blade system has only one ring of pump blades, one ring of turbine blades and one ring of guide blades whereas the 2-stage type has one ring of pump blades and two rings of turbine blades with one intermediate ring of guide blades. However, many variants of these two main type of torque converter blade systems have been proposed including blade systems having a divided guide blade ring and/or large numbers of rings of turbine blades and/or rings of guide blades and even a divided pump ring.

The present invention is particularly but not exclusively directed to a torque converter blade system of the 1½-stage type wherein the ring of guide blades is located in the torque converter working chamber in a position (considered relative to the direction of fluid flow within the working chamber) immediately before the inlet of the pump blades. The working chamber may be formed with many different cross-sectional shapes such as circular, half-circular, or pear-shaped, etc..

A torque converter blade system according to the invention influences the fluid circulation in the blade system by virtue of novel and specific blade shape so that, when the so-called shift-point is reached, the circulation of fluid in the blade system rapidly diminishes. Rapid diminution of the fluid circulation results in not only a reduction in the torque absorption but also a simultaneous reduction in the efficiency thereby avoiding, when the torque converter is running above the shift point, a high torque absorption and low efficiency since under such running conditions mechanical energy is simply converted into heat.

One known method of avoiding the above is the use of a free wheel on the guide vane shaft so that, when the pump and turbine are rotated at the same speed, there is no force creating fluid circulation within the working chamber. The torque absorption of the blade system is, therefore, low and depends primarily on the torque necessary to drive the free wheel. At speed ratios between the shift point and $n_2/n_1 = 1$ the guide blades are free wheeling and the torque converter operates as a coupling with the torque absorption related to $n_1$ and to $(n_2/n_1)$.

The existence of a free wheel in the torque converter invariably causes problems because it is required to function normally, whilst running in oil, both during connection and when free-wheeling at high speed. Moreover, the free wheel is located in a space completely filled with oil having a viscosity which may vary over a wide range due primarily to the variation in temperature within the working chamber. A wide variation in the viscosity considerably reduces the safety limits of the friction force required to lock the free wheel. The temperature of the fluid in the working chamber may be within the range $-40°$ up to $+k50°$ C, and in spite of such a wide temperature range it is not unusual for different oils between SAE 5 and SAE 20 or even SAE 30 to be used.

The blade system of the present invention provides apart from specific new characteristics, an extremely high peak efficiency in relation to the stall torque ratio obtained as well as providing favourable input torque characteristics below the shift point.

The blade system of the invention allows a torque converter incorporating a lock-up clutch to also include a stationary ring of guide blades without producing excessive losses in direct drive. In fact such a converter only produces about 2% losses considered in relation to full input power at stall and $n_1$ maximum whereas a loss of the order of 1% can be expected when the ring of guide blades is mounted on a free wheel. Simultaneously, it should be borne in mind that the free wheel is the weakest point in such torque converters in that it is the only component which causes trouble.

Thus elimination of the free wheel, even in the normal power range for heavy duty service is of utmost interest, and more particularly in cases where the torque converter includes the power saving lock-up clutch in conjunction with a multi-step gear box.

Furthermore, relatively large torque converters require large free wheels which are not generally available off-the-shelf and must, therefore, be specially made, thereby increasing the cost of the torque converter. In such applications the loss of an extra 1% in direct drive when eliminating the free wheel is less important, especially when a manufacturer or user can completely ignore the cost and availability of the free wheel units.

In applications where a free wheel is desirable, the conditions, under which the free wheel operates are improved, because the normal drag torque of the free wheel using a blade system according to the invention is sufficient to reduce the speed of rotation of the ring of guide blades to 25% of the speed of the rings of the pump and the turbine blades. Thus, the loss is in fact lower than the normal percentage loss and, simultaneously, wear on the free wheel is reduced by virtue of the reduction in relative speeds.

In applications where a torque converter according to the invention with or without direct drive is combined with a mechanical gear box, a transmission is obtained which does not necessarily require automatic shifts because there is no possibility to run at high speed ratios with low efficiency and high torque absorption. In such cases it is not necessary to effect a shift into a higher gear at a distinct point. It does not matter, therefore, if the driver effects a shift too late because a late shift will neither create overheating or increased fuel consumption. In fact, for an application, where direct drive will not be used, there is obtained for the first time not only a distinct top speed in each gear but also the advantage that driving under unacceptable conditions is not possible.

SUMMARY OF THE INVENTION

According to the present invention the above features are achieved by a blade system of such a form that (above a certain speed ratio which is only a little higher than the shift point and for speed ratios higher than this value) different quantities of circulation of fluid through the blade system produce practically no change in the direction of fluid flow through the guide blades whereby, at lock-up, where the pump and the turbine rotate at the same speed, the guide blades may rotate slowly or be stationary thereby reducing agitation of the working fluid because the drag torque of the guide blades will not, of itself, contribute to but will counteract fluid circulation. When the guide blades are stationary in conditions above the shift point, the guide blades operate to balance the pumping effect of the pump blades relative to the turbine blades in such a way that a low fluid circulation prevails through the blade system, so as to achieve a low torque absorption.

It is important that the fluid circulation is achieved within a small change of speed ratio and the test diagrams hereinafter described show that this is the case. The reason is that the inlet direction to the guide blade changes quickly in the range close to the shift point, since with a constant fluid quantity (which is counteracted by reduction in fluid circulation) the quantity of fluid circulated drops quickly due to the shape of the blade system according to the invention to values giving a torque absorption of the pump as shown in FIGS. 2 and 3.

DESCRIPTION OF THE DRAWINGS

The invention will be described by way of example with reference to the accompanying drawings in which:

FIGS. 2 and 2A are graphs showing the performance of the torque converter according to FIG. 1 and with the blade system constructed and arranged for a relatively high torque absorption characteristic;

FIGS. 3 and 3A are graphs showing the performance of the torque converter according to FIG. 1 and with the blade system constructed and arranged for a low torque absorption characteristic;

FIGS. 5 and 5A are graphs showing the performance of the torque converter of FIG. 4 having the blade system of the invention with a ring of guide blades mounted on a one-way free wheel.

FIGS. 6 and 6A are graphs showing the same performance curves as in FIG. 5 but for a torque converter having a low torque absorption;

FIGS. 10A, 10B and 10C show diagrammatically the blade shapes and their location in the respective blade rings and particularly different blade angles and the radius given in the table included hereinafter.

DESCRIPTION OF PREFERRED EMBODIMENT

Figure 1:
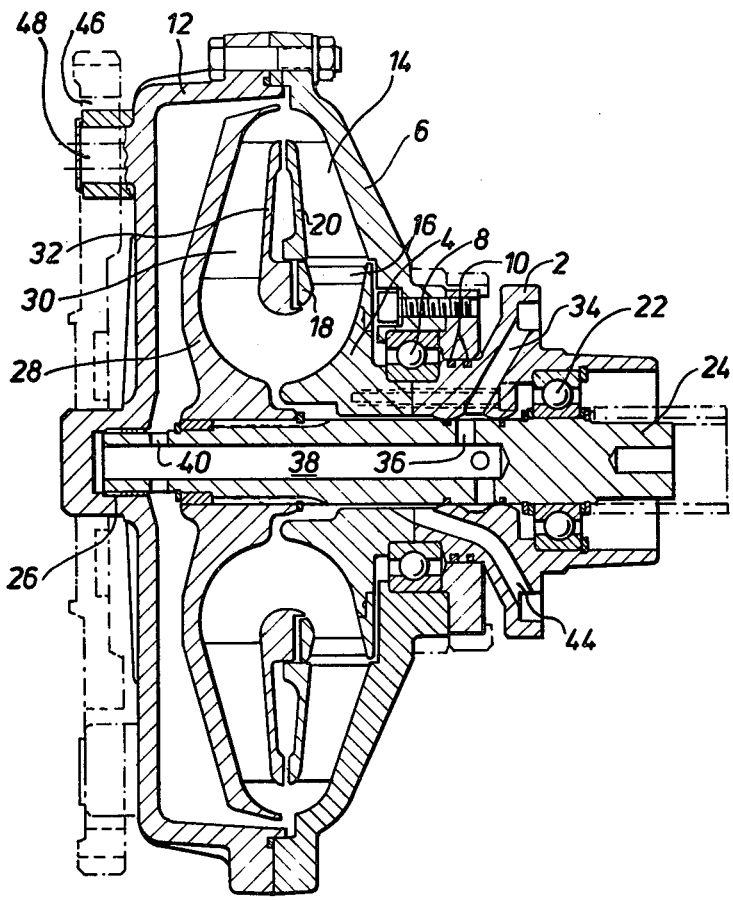
FIG. 1 is a cross-section of a torque converter having a ring of stationary guide blades and a blade system according to the invention.

The torque converter of FIG. 1 includes a so-called 1½-stage blade system in its simplest form and as previously mentioned. However, when the torque converter is fitted with a blade system according to the invention, the specific characteristics represented graphically in FIGS. 2, 2a, 3 and 3a are obtained.

In FIG. 1 reference 2 is a stationary abutment to which a guide blade hub 4 is attached and on which a part 6 of a rotatable casing is mounted on a bearing 8. The rotatable casing part 6 also has a front part 12 and, from the drawing, it will be seen that a ring of pump blades is carried by the part 6 whereas the guide blade hub 4 carries a ring of guide blades 16. The inner ends of the pump and guide blades are supported on side rings 20 and 18, respectively, which form a part of an inner core. The stationary abutment 2 is journalled through a bearing 22 onto a turbine shaft 24 and, in turn, the shaft 24 is also journalled in the front part 12 of the rotatable casing by a plane bearing 26. A turbine hub 28 carrying the turbine blades 30 which are associated with an inner core part 32 is also carried on the turbine shaft 24.

Circulation of working fluid and maintenance of the pressure thereof in the working chamber is accomplished between channels 34 and 44 in the stationary abutment 2, via channels 36, 38 and 40 in the turbine shaft 24, and via return passages formed between the parts 2, 4 and the parts 28, 24. Circulation of the fluid through the working chamber may be from channel 34 to channel 44 or vice versa. The rotatable casing 6, 12 is normally driven by a fly-wheel 46 via an axially slidable, torsionally and substantially stiff coupling 48. The actual form of blades in the blade system according to the invention is shown in FIGS. 10A, 10B and 10C, for pump blades 14, turbine blades 30 and guide blades 16 respectively.

Figure 2:
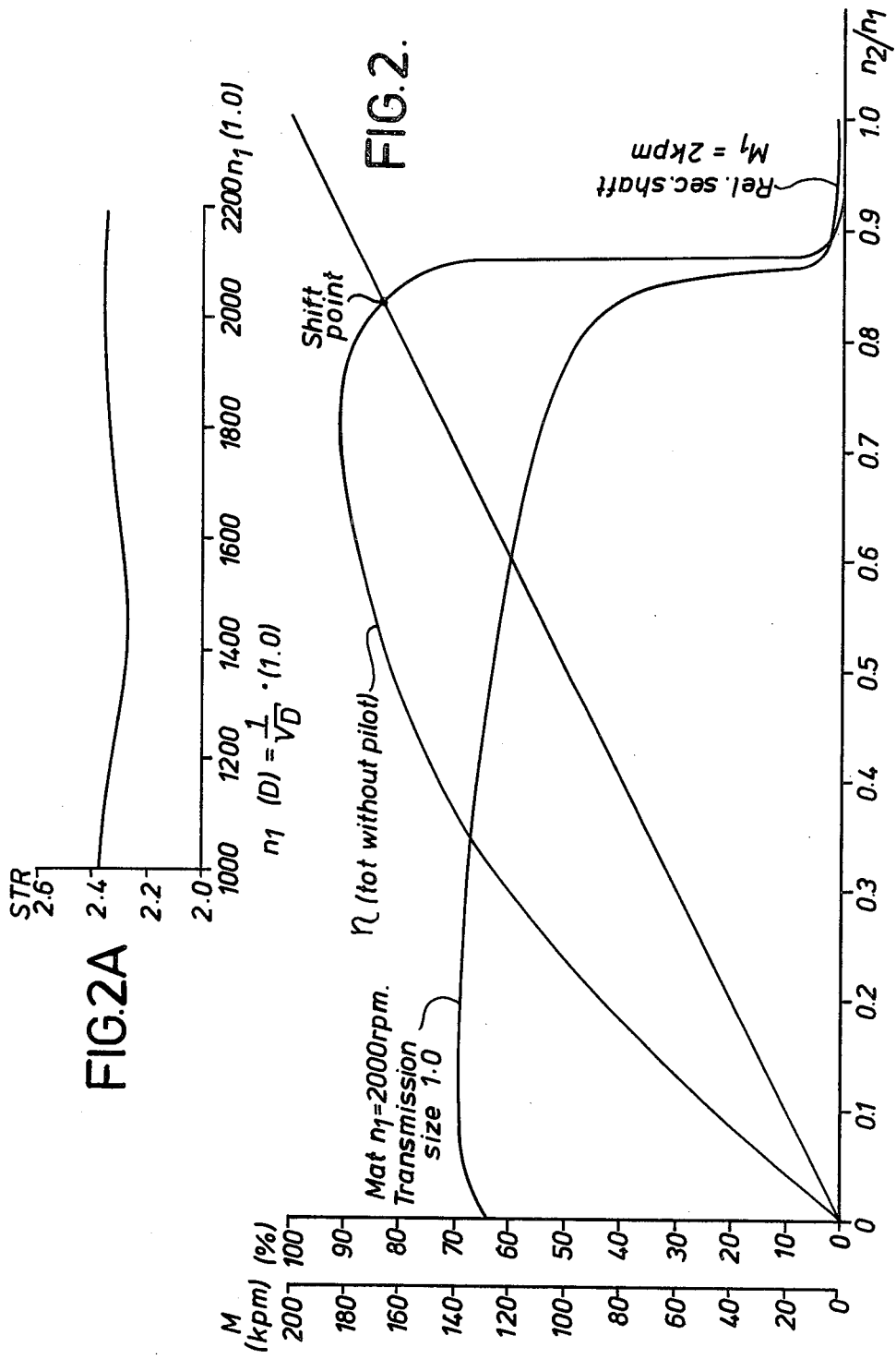

FIG. 2A shows the stall torque ratio (STR) of a torque converter having a blade system designed for a relatively high torque absorption with the pump blades having their outlet edges disposed on a fairly large diameter and with the outlet in radial or positive direction relative to the pump movement. It will be observed from FIG. 2 that a shift point of $n_2/n_1 = 0.835$ is achieved and that at a shift point of 0.865 the torque absorption (M) has fallen to a value which is about 5-6% of the torque absorption at stall. At a shift point slightly above 0.9 it will be seen that the torque absorption has fallen to 1.4% of the torque absorption at stall and less than 2% of the torque absorption at maximum efficiency. It is to be noted that, even if the torque converter is fitted with a free wheel, the torque absorption will be at least half this value at 1:1 in speed ratio. Further, it is to be noted that the peak efficiency of the blade system is, in its machined form or dye-cast form, above 90% even for a small blade system having a diameter of below 250mm. Further, for the high torque absorption in question a fairly high stall torque ratio for this type of torque converter of about 2.3 is achieved and further, that the stall torque ratio is very stable for different input speeds (FIG. 2A). A further advantage of the system is that the primary torque developed below the shift point is favourable having a relatively high ratio between torque at maximum point and torque at shift point of about 1.5, and is especially suitable for achieving maximum acceleration in normal automotive vehicle application.

Figure 3:
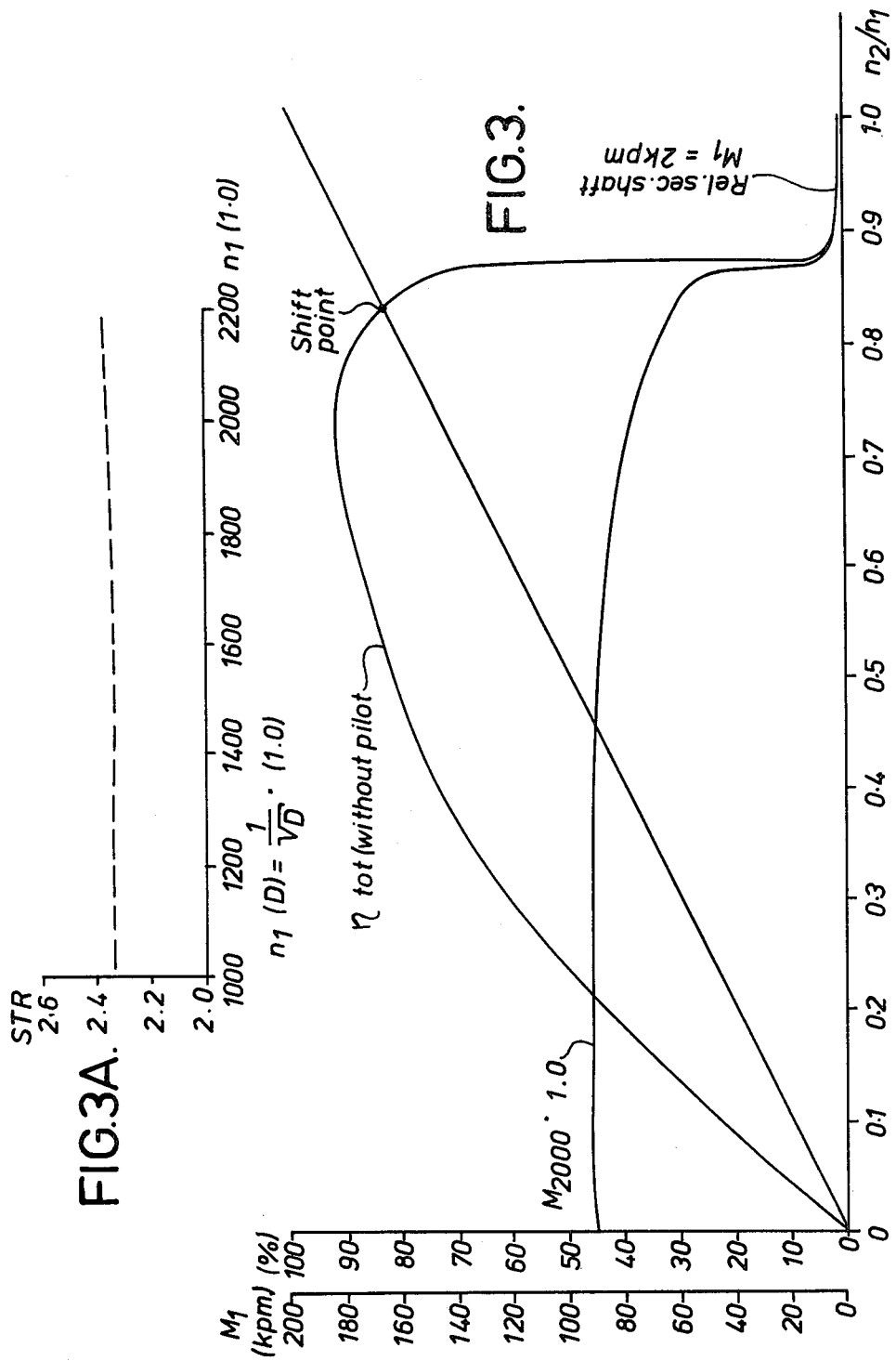

FIG. 3 shows that for the blade system in question but for a lower torque absorption the same high peak efficiency and stall torque ratio is obtained and that the specific characteristics of the torque absorption and efficiency above a certain point is still achieved. On both graphs it is seen that the efficiency stays above 70% until the torque absorption has dropped to a very low value.

When a torque converter according to FIG. 1 having a blade system providing the characteristics of FIGS. 2 and 3 is used in, for instance, a lift truck, two different and important features will be achieved when compared with existing torque converters of the simple 1½-stage type without free wheel. The two features are a distinct top speed for a certain engine speed and the impossibility to operate under part load at such a high speed ratio that the mechanical energy is nearly all converted into heat. The last mentioned feature has the advantage that transmission will only require a very small cooling capacity thereby reducing the fuel consumption and fulfilling, without extra arrangements, the limited top speed requirement. This, as mentioned above, is achieved without a free wheel for the ring of guide blades.

Figure 4:
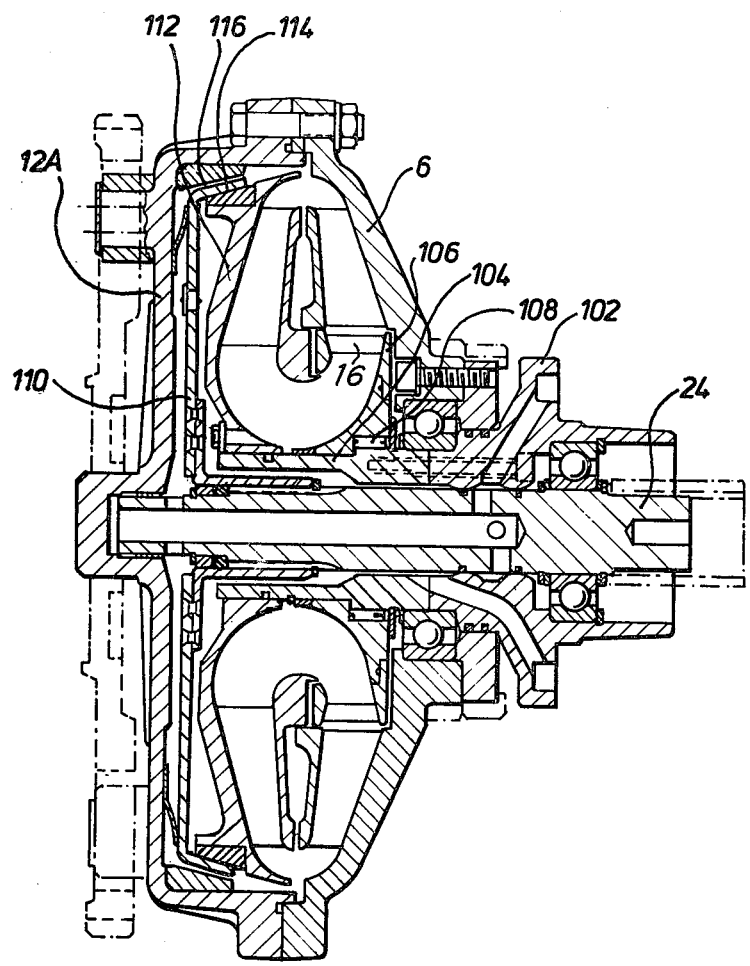
FIG. 4 is a cross-section of a torque converter which is similar to the torque converter of FIG. 1 but modified to include a lock-up clutch and a releasable turbine torque transmitting member as disclosed in our British Pat. No. 1,414,641.

FIG. 4 shows a torque converter and blade system similar to that of FIG. 1 but modified to include an arrangement (described in my U.S. Pat. No. 3,831,463) allowing lock-up of the turbine shaft to the rotatable casing and, less important in this specific case, the possibility of releasing the ring of turbine blades from the turbine shaft. Such a release possibility enables a positive neutral to be obtained and thereby renders unnecessary any other types of disconnection on the secondary side for most fields of application. In the embodiment of FIG. 4 a stationary abutment, here designated 102, has a tubular extension 104 on which a guide blade hub 106 and a free wheel 108 are mounted thereby allowing the guide blade hug (and consequently the guide blades) to rotate in the same direction of rotation as the rotatable casing 6, but not allowing rotation in the opposite direction. The bladed components, the inner core, the bearings and the shafts are constructed and mounted in the same way as in the embodiment of FIG. 1. The modification includes an extension 110 carried by the turbine shaft 24 and to which a ring of turbine blades 112 can be connected and disconnected by a conical friction clutch 114. Connection and disconnection of the clutch 114 is accomplished by establishing a pressure differential on opposite sides of radial extension 110 in accordance with my U.S. Pat. No. 3,831,463. Another cone clutch 116 can be operated in a similar way for connecting the turbine shaft 24 to the rotatable casing 6/12A. If the turbine shaft is connected to the casing and if the ring of turbine blades 112 is connected to the turbine shaft, the whole blade system will rotate. However, due to the construction and form of the blade system according to the invention, the ring of guide blades 16 will not rotate at the same speed or even practically the same speed as the pump blades or the turbine blades because, even at much lower speeds, it will not significantly agitate circulation of fluid through the blade system and therefore it will rotate at a considerably lower speed. Rotation of the ring of guide blades at such speeds reduces the wear on the free wheel and/or relatively speaking allows the free wheel to operate under a higher connection force on the blocks in the free wheel which is highly desirable owing to the wide variation in oil viscosity and without causing wear. Thus the blade system of the invention has given the designer a wider scope for better design and at the same time reduced wear of the free wheel.

Figure 5:
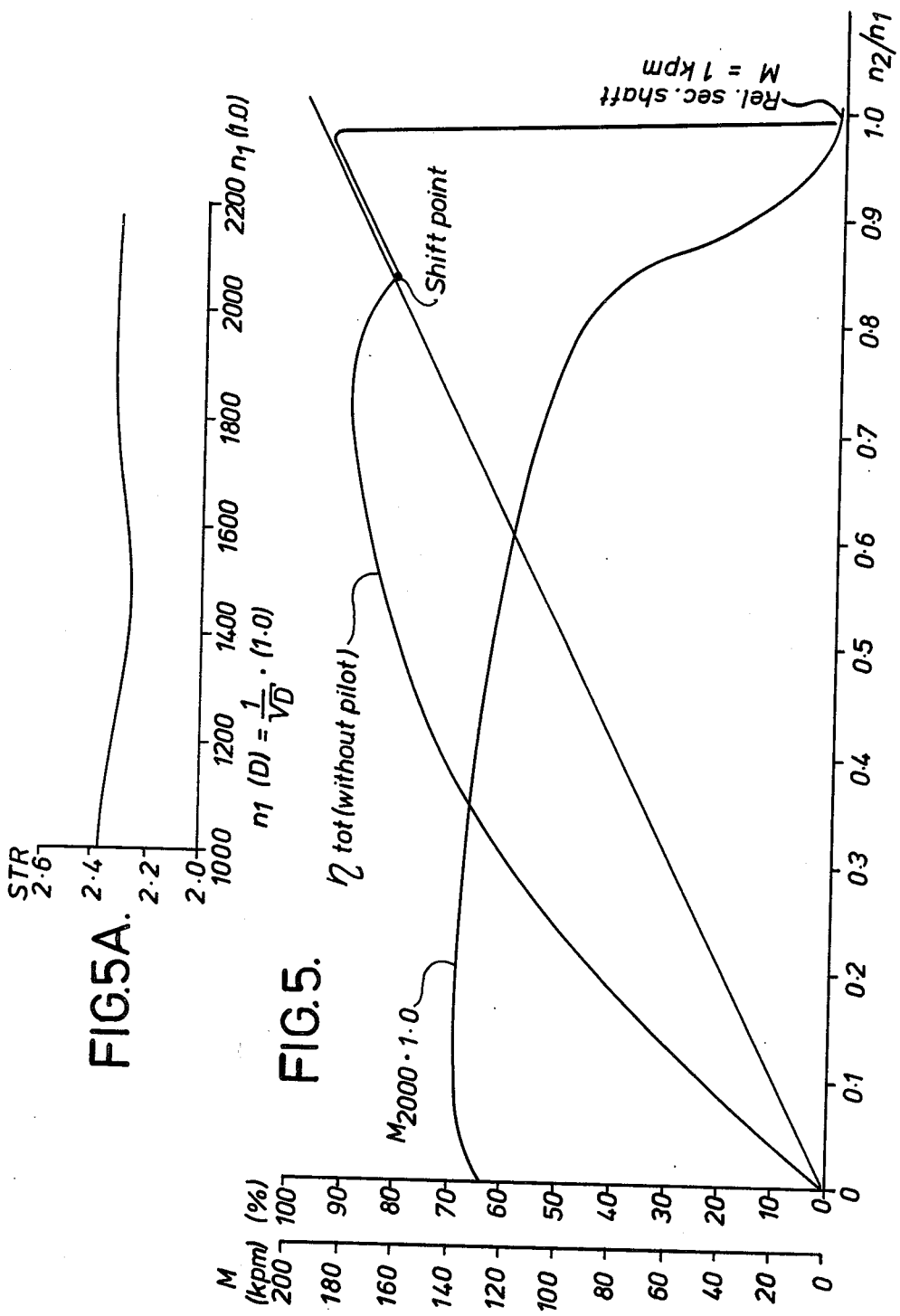

FIGS. 5 and 5A show the performance obtained for a high torque absorption transmission according to FIG. 4 having a blade system according to the invention and with the ring of guide blades mounted on a one-way free wheel. When compared with FIG. 2, FIG. 5 indicates an extension of the hydraulic torque converter field, where the torque converter operates as a coupling. This coupling action, however, due to rapidly falling torque absorption, is not very useful and, for the majority of applications, a lock-up clutch is required. In such circumstances the free wheel avoids, when compared with normal blade systems, the torque absorption of the blade system per se at speed ratio 1:1.

When compared with known torque converter transmissions this particular embodiment having a free wheel has the advantage that the differential speed will be low because the guide blades will have a high slip relative to the pump and the turbine blades when the converter is in direct drive.

Figure 6:
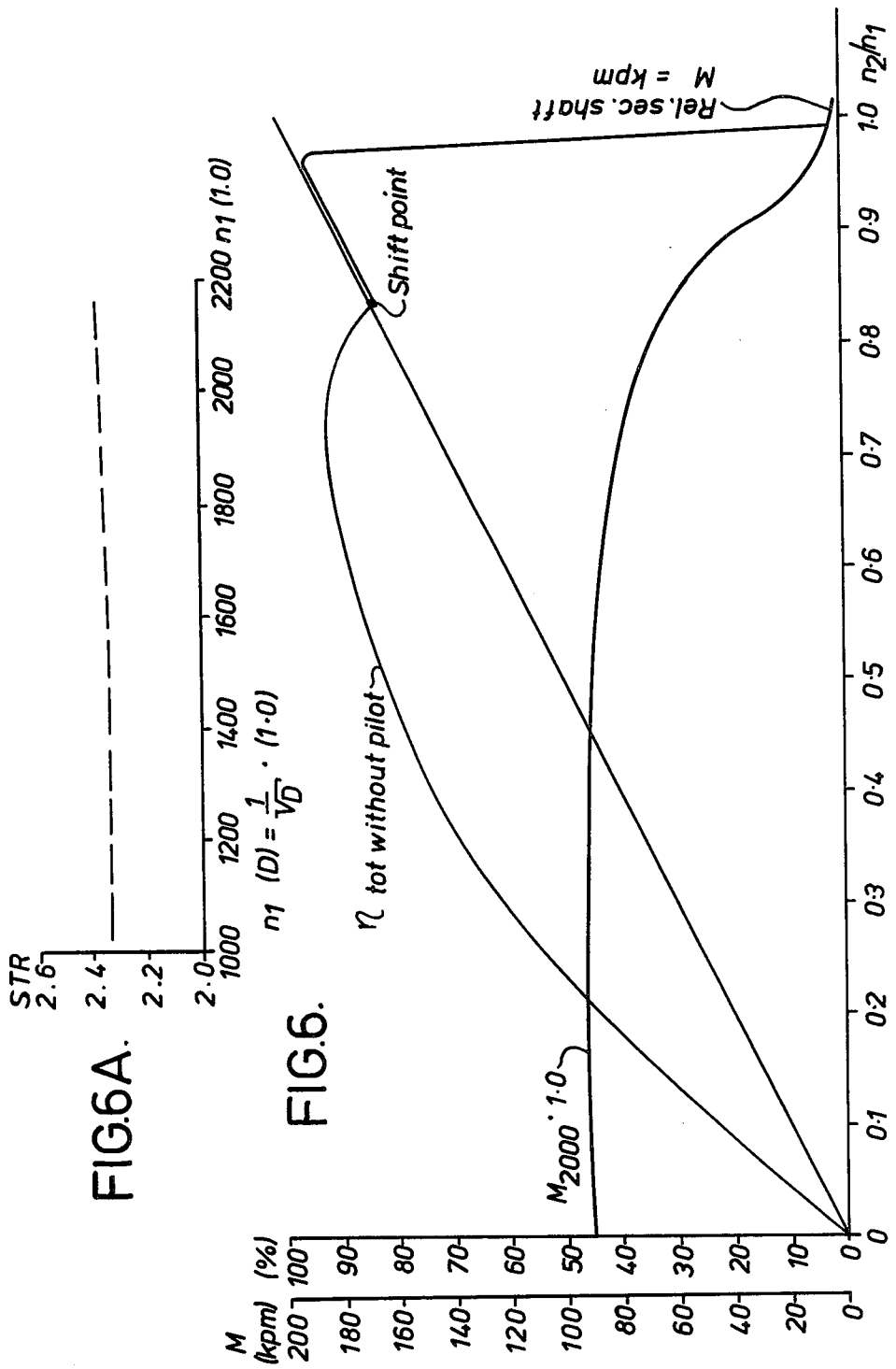

FIGS. 6 and 6A show performance graphs similar to FIGS. 5 and 5A but for a torque converter having low torque absorption. It will be observed that different torque absorptions do not essentially change the type of performance and, as described, the virtue of the blade system according to the invention used in conjunction with arrangements giving the performances indicated in FIGS. 5/5A and 6/6A is that, in direct drive, the ring of guide blades rotates at an essentially lower speed than would be the case in a locked-up torque converter, thereby reducing wear on the free wheel and allowing higher spring action for connection of the free wheel.

Figure 7:
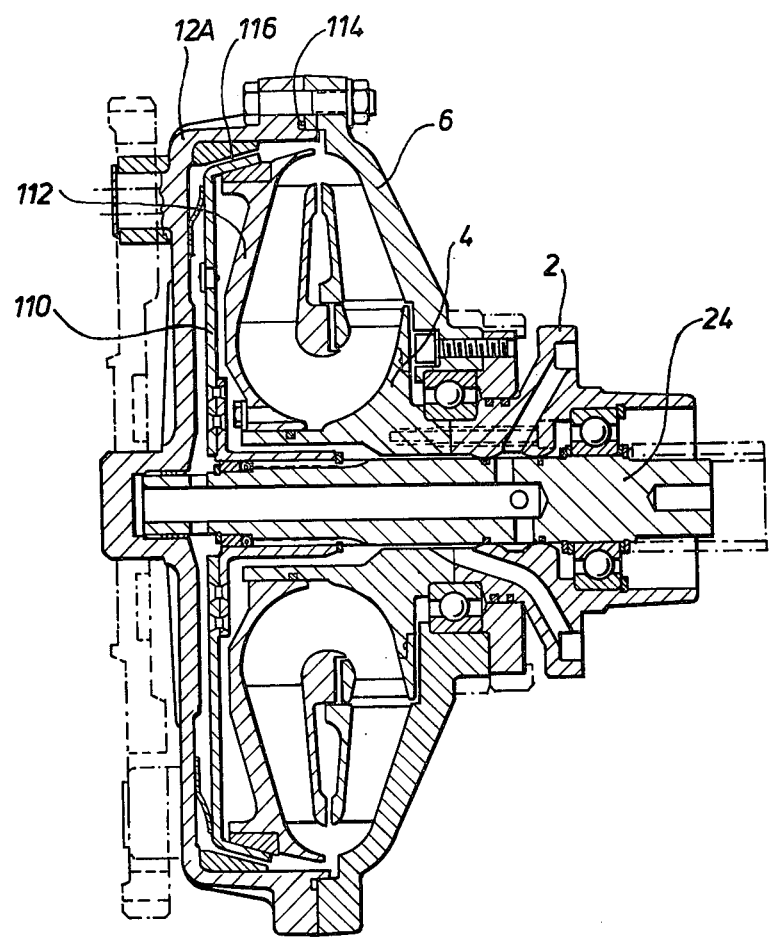
FIG. 7 shows a torque converter which is the same as that of FIG. 4 except that the ring of guide blades is not mounted on a free wheel even though the converter has a lock-up clutch. With this blade system the torque absorption of the torque converter has the same performance characteristics as shown in FIGS. 5 and 5A.

FIG. 7 shows a torque converter which is the same as that in FIG. 4 except that the free wheel is omitted. When this torque converter is in direct drive then the speed ratio is always 1:1 and the loss received by having the guide vane stationary, even when the turbine is rotating with the turbine shaft, is very low. As mentioned previously, this saves the use of the free wheel in large units and for small units it omits a troublesome mechanical part. It also affords new features if, for instance, the unit is mounted in a lift truck because you can have a top speed of the truck when hydraulic drive is used. Thus a speed range is available which is suitable for normal working conditions and, when direct drive is connected, a higher top speed is available for transporting the vehicle. Such a speed combination is, of course, advantageous because it will never be necessary to have an automatic connection of the direct drive and because in spite of the stationary ring of guide blades it is not possible to obtain a high torque absorption and a low efficiency at the same time.

One advantage of this embodiment is that it is now possible without incurring excessive losses to produce a torque converter which can operate in direct drive with a stationary ring of guide blades.

Figure 8:
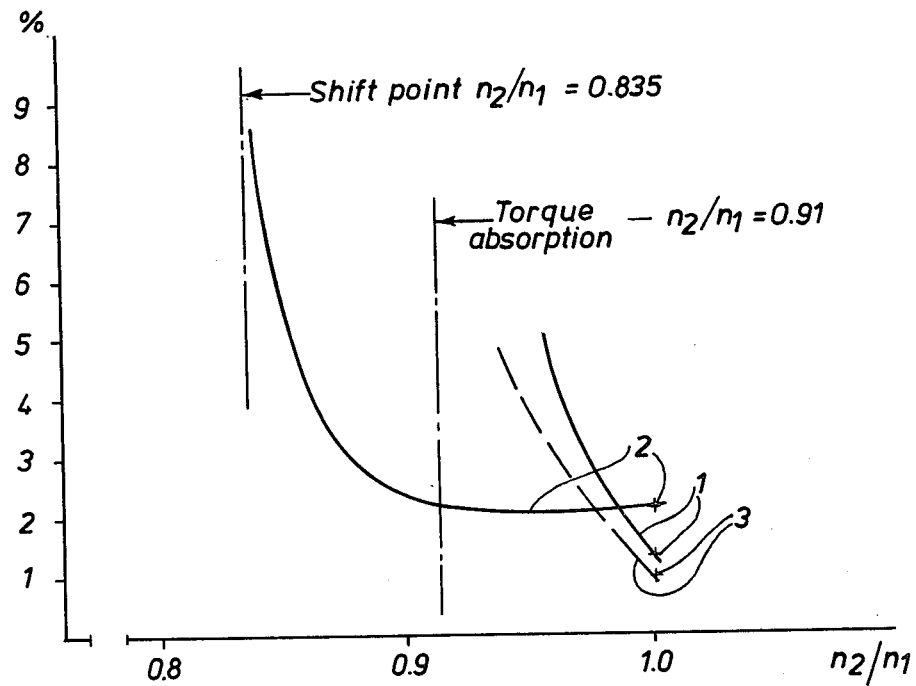
FIG. 8 shows graphically the losses experienced in a torque converter having the blade system of the invention when in direct drive firstly with and secondly without free wheel for the ring of guide blades.

FIG. 8 shows the torque absorption of the torque converters according to FIGS. 4 and 7 at and below the direct drive condition. These graphs show that for most applications, especially for large vehicles, omission of the free wheel for the guide blades is justified whereas for smaller vehicles with high speed engines, mostly running in direct drive, the free wheel may be included.

Point 2 and the line 2 show development of the torque absorption at and below $n_2/n_1 = 1.0$ for the torque converter of the invention having a stationary guide vane. This means at $n_2/n_1 = 1.0$, the direct drive may be connected without free wheel.

Point 1 shows the torque absorption at and below $n_2/n_1 = 1.0$ for known torque converters having a known blade system with the ring of guide blades mounted on a free wheel.

Point 3 shows the torque and torque development when a torque converter with the blade system according to the invention has a free wheel.

The difference between points 1 and 3 depends on whether or not the ring of guide blades is allowed a considerable drag relative to the pump and the turbine blades without increasing the torque absorption. This diagram indicates why, in some cases, the torque characteristic of the blade system of the invention renders a free wheel unnecessary, even in direct drive and why, in other cases when using a free wheel and direct drive, both the running conditions of the free wheel are improved and the losses in direct drive are diminished in relation to known forms of torque converters. To obtain a good understanding of the influence on fuel consumption it is necessary to divide the percentage losses at maximum power by the percentage average load of the engine for the application under consideration. This means that for an application with high average load, the extra loss when omitting the free wheel is of minor importance, whereas for an application, using a high speed and having a relatively low average load, the extra loss in question will be of considerable importance. For instance a torque converter for an industrial application can omit the free wheel if using the blade system of the invention with a lock-up clutch connected.

Figure 9:
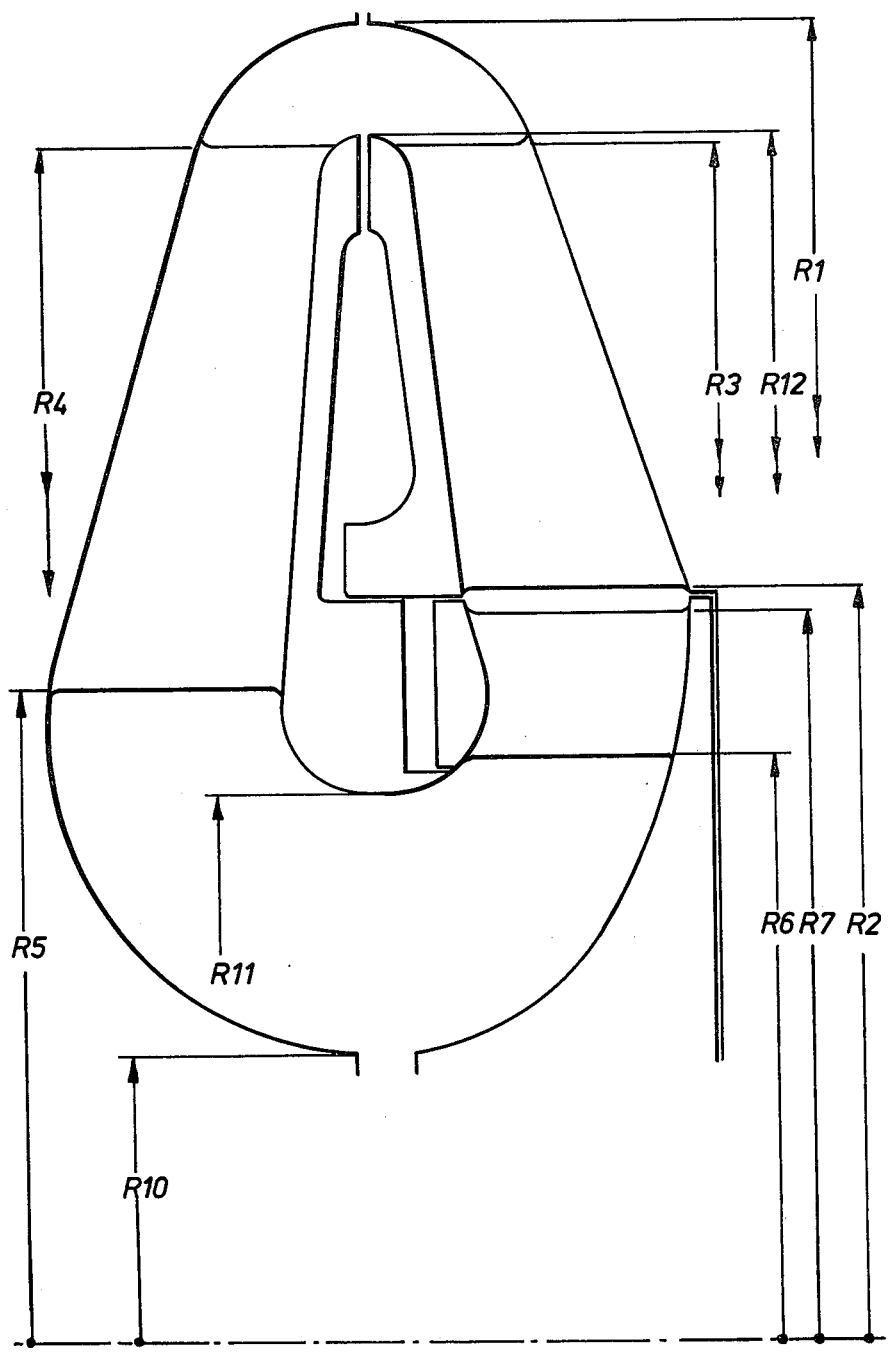
FIG. 9 is a cross-section of the working chamber, in which the blade system is mounted. However, the shape of the cross-section itself is not essential for carrying out the invention. The blade system in question, however, is favourable in itself and was mounted in such a working chamber for the purpose of tests, the results of which tests are included in this specification.

FIG. 9 shows the cross-sectional shape of the torque converter working chamber, in which by application of the blade system of the invention the performance graphs of FIGS. 2, 2A, 3, 3A, 5, 5A, 6, 6A and 8 are obtained. The cross-sectional shape of the working chamber, however, is not essential for achieving the objects of the invention. However, the cross-sectional shape shown combines the features of the invention with advantageous features for fabrication and it is, therefore, of value that the performance is achieved with this particular cross-section.

FIGS. 10A, 10B and 10C show, schematically pump 14, turbine 30 and guide blades 16 bearing references relating to characteristic dimensions and angular relationships concerning disposition of the blades in their blade rings. In these Figures, the radii bearing reference $R_2$ etc. relate to radii bearing the same references in FIG. 9. In these Figures:

α (alpha) indicates the inlet angle of the several blades and $b$ the minimum distance between adjacent blades in the same blade ring. Considered slightly differently, $b$ is the narrowest or throat portion of the flow channels formed between adjacent blades. Considered geometrically, α is that angle formed between a tangent drawn to a circle of radius $b$ struck from a centre located on the inlet edge of the blade, and another tangent drawn at the said centre and to a circle containing all the inlet edges of a ring of blades, for example, a circle of radius $R_3$ for the pump blades.

β (beta) is that angle between a chord CH drawn and a radial line RE (FIG. 10A).

γ (gamma) is that angle subtended at the axis of rotation X of the blade system by inlet edges $I_i$ and $I_{ii}$ of the ring of turbine blades shown in FIG. 10B.

δ (delta) is a measure of the curvature or angular deviation between the inlet and outlet of each blade and is the angle formed at the intersection of centre lines drawn through the inlet and outlet edges of a blade.

Z is the number of blades in a particular blade ring.

κo is the pitch of the inlet edges of a ring of blades. As an approximation, κo considered as a circumferential dimension of a circle of radius $R_5$ (FIG. 10B) is equal to the chord $I_i$-$I_{ii}$ and Sin α (calculated) = $b/κo$ and α = α (calculated) − (γ/2)

Figure 11A:
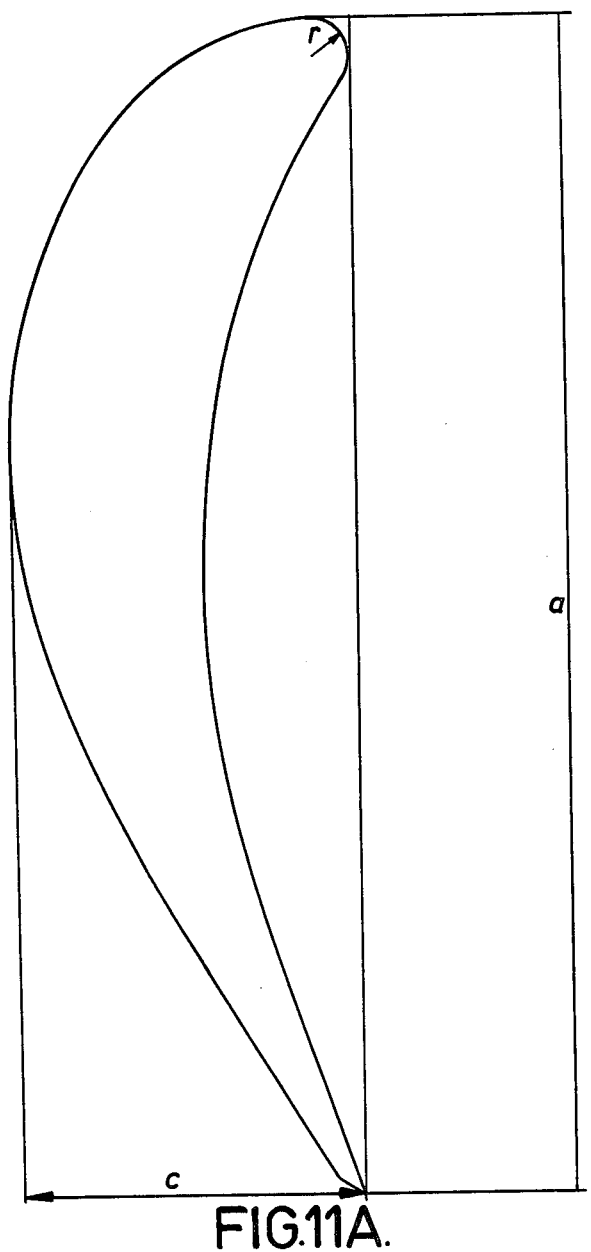
FIGS. 11A and 11B show a preferred shape of a turbine and a guide blade respectively.
Figure 11B:
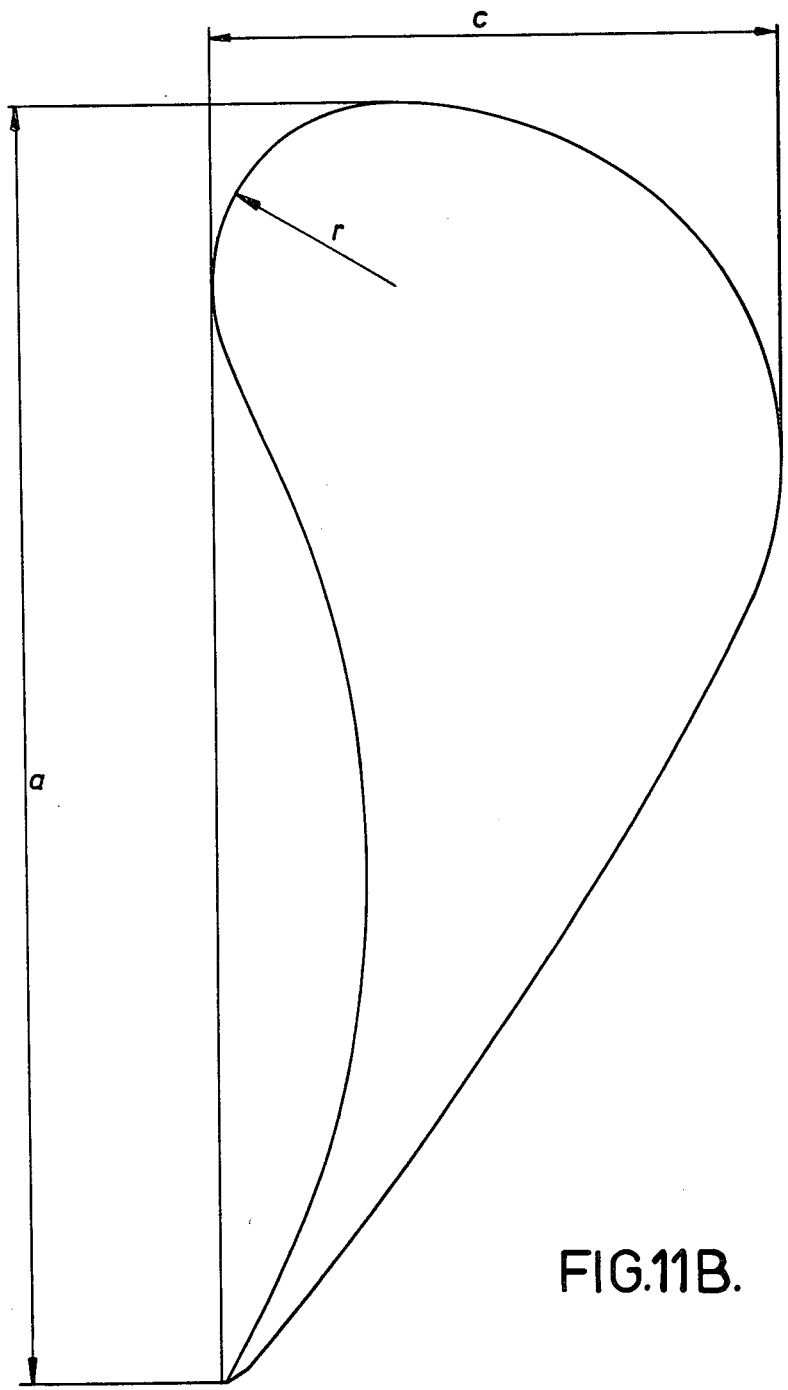

FIGS. 11A and 11B show a preferred cross sectional shape for the turbine and guide blades respectively each blade having a curved inlet of radius represented by reference $r$ and a tapered or bevelled outlet edge. In these Figures the maximum length and width of the blades are indicated as $a$ and $c$ respectively.

Figure 12:
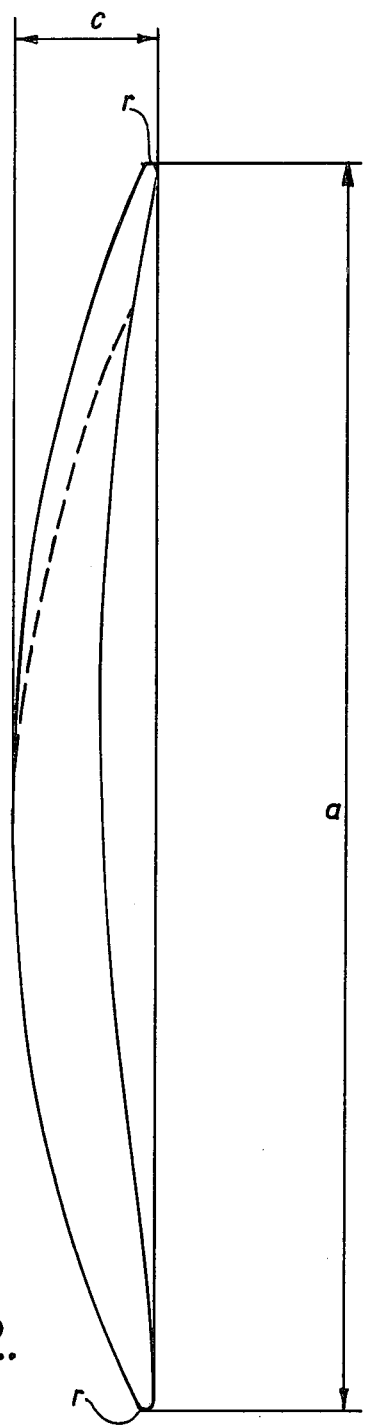
FIG. 12 shows the shape of a pump blade for a blade system having a high torque absorption without adversely influencing the specific performance characteristics shown in the FIGS. 2, 3, 5, 6 and 8.

FIG. 12 shows a pump blade in cross-section having a length $a$ and a breadth $c$ and inlet and outlet edges of radius $r$. Although reference $r$ has been used for nose radii in FIGS. 11A, 11B and 12, the actual dimension of the radius for the respective blades is not necessarily the same. Further FIGS. 11A, 11B and 12 must be viewed in conjunction with FIGS. 10A, 10B and 10C showing the angular relationship of the blades. Use of the pump blade of FIG. 12 affords the torque absorption Ms characteristic of FIGS. 2, 3, 5 and 6 in which the continuous line in FIG. 12 represents the highest Ms and the dotted line represents the lowest Ms. Where yet higher and lower Ms values are required, certain changes to the inlet and outlet portions of the pump blade should be made. Such changes would not, however, change the advantageous characteristics of a blade system according to the invention.

The following table shows the ranges of angles α, β, γ and δ and a ratio $R_o/R_i$ (namely the ratio of the radii of the outlet and inlet edges) of the pump, turbine and guide blades of the blade system hereindescribed.

TABLE

| Blade | Ratio Ro/Ri | | α | | β | |
|---|---|---|---|---|---|---|
| | max | min | max | min | max | min |
| Guide | 1.27 | 1.10 | 35° | 20° | 42° | 25° |
| Pump | 1.70 | 1.49 | 110° | 70° | 25° | 10° |
| Turbine | 0.6 | 0.5 | 35° | 14° | 22° | 8° |

| Blade | γ | | δ | |
|---|---|---|---|---|
| | max | min | max | min |
| Guide | 15° | 5° | 40° | 110° |
| Pump | 20° | 12° | +10° | −30° |
| Turbine | 18° | 10° | 60° | 100° |

What is claimed is:

1. A hydrodynamic torque converter comprising a rotatable casing enclosing a closed circuit for circulation of a working fluid defined by a torroidal working chamber having an annular core therein, the closed circuit including in cross-section an outflow section, an inflow section and radial inner and radial outer transition regions connecting the inflow and outflow sections, a blade system located within the working chamber and including a ring of pump blades, a ring of guide blades, and a ring of turbine blades, the blades of the blade system being generally radially disposed within the working chamber in accordance with the parameters set out in the following table, in which $R_o/R_i$ is the ratio of the outlet and inlet radii for the respective rings of blades, α (alpha) is the inlet angle of the blades, β (beta) is that angle formed between a chord drawn for a blade and a radial line drawn from the centre of rotation of the system and the outermost edge of the blade, γ (gamma) is the angle subtended at the centre of rotation of the blade system by the innermost edges of two adjacent blades, δ (delta) is a measure of the curvature of the blade, and in which the radii of the outermost edges of the pump (R3) and turbine (R4) blades are at least 85% of the maximum radius of the torroidal working chamber:

TABLE

| Blade | Ratio Ro/Ri | | α | | β | |
|---|---|---|---|---|---|---|
| | max | min | max | min | max | min |
| Guide | 1.27 | 1.10 | 35° | 20° | 42° | 25° |
| Pump | 1.70 | 1.49 | 110° | 70° | 25° | 10° |
| Turbine | 0.6 | 0.5 | 35° | 14° | 22° | 8° |

TABLE-continued

| Blade | max | min | max | min |
|---|---|---|---|---|
| Guide | 15° | 5° | 40° | 110° |
| Pump | 20° | 12° | +10° | −30° |
| Turbine | 18° | 10° | 60° | 100° |

2. A torque converter according to claim 1 wherein the ring of pump blades is fixedly mounted against rotation in either direction and including a lock-up clutch.

3. A torque converter according to claim 1 wherein the ring of guide blades is rotationally fixed relative to a stationary abutment.

4. A torque converter according to claim 1 wherein the ring of guide blades is mounted on a free wheel carried by a stationary abutment.

5. A torque converter according to claim 1 wherein the ring of turbine blades is rotationally fixedly carried by a turbine shaft constituting an output for the converter.

6. A torque converter according to claim 4 wherein the free wheel includes a spring member having a connecting spring force providing a slip torque between 0.5 and 1% of torque converter, torque absorption at maximum efficiency point so as to reduce the slip speed.

7. A torque converter according to claim 1 in which the blades of the said turbine ring have an inlet radius of about 0.3% of the length of the blade and the blades of the said guide ring have a nose radius about 13% of the length of the blade.

8. A torque converter according to claim 1 having a blade system, wherein the value of β (beta) for the pump, turbine and guide blades fall within the ranges of 20°, 16°, 22°, 12° 39°, 29° respectively.

9. A torque converter according to claim 1 wherein the value of α for the pump, turbine and guide blades fall within the ranges 86°, 83°, 25°, 14°, 31°, 24° respectively.

10. A torque converter according to claim 1 wherein the radial positions of outlet of the pump, inlet of the turbine and outlet of the blades fall within the ranges 85%, 85-96%, 50-65% considered as percentages of the maximum diameter of the torroidal working chamber.

11. A torque converter according to claim 1 wherein the value of (delta) for the pump, turbine and guide blades fall within the ranges +10°, −30°, 80°-100°, 40°-80°, respectively.

12. A torque converter according to claim 1 wherein the torroidal working chamber has axial extension less than 50% of the maximum diameter thereof.

13. A torque converter according to claim 1 including a lock-up clutch and means for selectively releasing the ring of turbine blades from an extension of a secondary output shaft.

14. A torque converter according to claim 1 in which the Ro/Ri ratio for the pump, the turbine and the guide blades fall within the ranges 1.7-1.45; 0.6-0.5; 1.2-1.1, respectively.

* * * * *